United States Patent
Earnhardt, Jr.

(10) Patent No.: US 10,244,389 B1
(45) Date of Patent: Mar. 26, 2019

(54) ENCRYPTED HFDL POSITION REPORTS

(71) Applicant: Rockwell Collins, Inc., Cedar Rapids, IA (US)

(72) Inventor: Neil J. Earnhardt, Jr., Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 161 days.

(21) Appl. No.: 15/217,274

(22) Filed: Jul. 22, 2016

(51) Int. Cl.
*H04L 29/06* (2006.01)
*H04W 12/02* (2009.01)
*H04W 72/04* (2009.01)
*H04B 7/185* (2006.01)
*H04W 12/04* (2009.01)
*G06F 21/60* (2013.01)

(52) U.S. Cl.
CPC .......... *H04W 12/02* (2013.01); *G06F 21/602* (2013.01); *H04B 7/18506* (2013.01); *H04L 63/0471* (2013.01); *H04W 12/04* (2013.01); *H04W 72/042* (2013.01); *H04W 72/0413* (2013.01); *H04W 72/0453* (2013.01); *H04L 2209/80* (2013.01)

(58) Field of Classification Search
CPC ................ H04W 12/02; H04W 12/04; H04W 72/0413; H04W 72/0453; H04W 72/042; H04L 63/0471; H04L 2209/80; G06F 21/602; H04B 7/18506
See application file for complete search history.

(56) References Cited

U.S. PATENT DOCUMENTS

| | | |
|---|---|---|
| 6,353,779 B1 | 3/2002 | Simon et al. |
| 6,567,729 B2 | 5/2003 | Betters et al. |
| 6,732,027 B2 | 5/2004 | Betters et al. |
| 6,948,062 B1 | 9/2005 | Clapper |
| 6,959,236 B2 | 10/2005 | Betters et al. |

(Continued)

FOREIGN PATENT DOCUMENTS

DE    102005031439 A1    1/2007

OTHER PUBLICATIONS

John Croft; "Airlines Get Jump on Tracking Mandates"; Aviation Week Network; Aviation Week and Space Technology; http://aviationweek.com/commercial-aviation/airlines-get-jump-tracking-mandates; Jan. 5, 2016; 4 pages.

*Primary Examiner* — Malcolm Cribbs
*Assistant Examiner* — Cheng-Feng Huang
(74) *Attorney, Agent, or Firm* — Angel N. Gerdzhikov; Donna P. Suchy; Daniel M. Barbieri

(57) ABSTRACT

A system and related method for encrypting HFDL position reports of an aircraft involves determining the position of the aircraft based on signals received from navigational satellites and generating data packets based on the position and an aircraft identifier such as an ICAO address. The data packets are encrypted for transmission to HF ground stations as a position report normally would be (e.g., as a performance diagnostic packet or a frequency diagnostic packet). However, the encrypted position data can only be decrypted by a control key provided to traffic control authorities or a subscriber key provided to the aircraft owner or authorized personnel. Only holders of the control key or subscriber key may decode the aircraft position and track the aircraft's heading or position.

12 Claims, 3 Drawing Sheets

(56) References Cited

U.S. PATENT DOCUMENTS

| | | |
|---|---|---|
| 6,965,816 B2 | 11/2005 | Walker |
| 7,233,282 B2 | 6/2007 | Yule et al. |
| 7,359,777 B2 | 4/2008 | Betters et al. |
| 7,511,635 B2 | 3/2009 | Borel et al. |
| 9,001,642 B2 | 4/2015 | Blanchard et al. |
| 2003/0177094 A1 | 9/2003 | Needham et al. |
| 2012/0177198 A1* | 7/2012 | Cabos .................. H04L 9/0825 380/270 |
| 2015/0325129 A1* | 11/2015 | Simonin .............. G08G 5/0013 701/14 |
| 2016/0330301 A1* | 11/2016 | Raindel ................ H04L 67/327 |
| 2017/0366250 A1* | 12/2017 | Ovens ..................... H01Q 1/28 |

\* cited by examiner

200

202 — Receiving, via an HF data radio, at least one request for a position report from an HF ground station at an uplink frequency between 2 MHz and 30 MHz, the position report associated with an aircraft 204 — Determining a position of the aircraft via at least one position receiver of the aircraft 206 — Generating position data based on at least the determined position and a unique identifier of the aircraft 208 — Generating encrypted position data by applying at least one encryption key to the generated position data 210 — Scanning a range from 2.5 MHz to 30 MHz for a downlink frequency via the HF data radio 212 — Transmitting, via the HF data radio, the encrypted position data to the HF ground station at the downlink frequency

*FIG. 3*

ENCRYPTED HFDL POSITION REPORTS

CROSS-REFERENCE TO RELATED APPLICATIONS

This application is related to U.S. patent application Ser. No. 14/465,414, filed Aug. 21, 2014; and Ser. No. 14/476,908, filed Sep. 4, 2014. Said U.S. patent application Ser. Nos. 14/465,414 and 14/476,908 are herein incorporated in their entirety.

BACKGROUND

Embodiments of the inventive concepts disclosed herein are directed generally to a system and related method for encrypting position data of an aircraft transmitted via the High Frequency Data Link (HFDL) protocol. HFDL uses the unique properties of high frequency (HF) radio waves (waves in the spectral band between 2.0 MHz and 30 MHz) to propagate long-range data or voice communications through the ionosphere (c. 30-375 miles above the earth's surface) at variable frequencies and transmission speeds (300, 600, 1200, or 1800 bps) depending on current propagation conditions (e.g., atmospheric temperature or electron density). The HFDL infrastructure incorporates a network of dedicated HF ground stations (HGS), currently comprising 15 HGS worldwide, each having an effective radius around 3,000 NM and thereby providing overlapping coverage over six continents. The network of HGS allows for single-hop and multi-hop transmissions over great distances and through transoceanic airspace underserved, or unserved, by surveillance radar or automatic dependent surveillance-broadcast (ADS-B) services.

Aircraft tracking sites such as FlightAware (flightaware.com) or other aircraft situation display to industry (ASDI) vendors allow the general public to track the position, heading, destination, tail number, or other particular details of commercial and civilian flights in near-real time, based on data from traffic control radar, ADS-B transmissions to and from the aircraft, or aircraft data link services using HFDL or similar protocols (e.g., Aircraft Communications Addressing and Reporting System (ACARS) or satellite communications (SATCOM)). For example, a hobby-grade shareware program called PC-HFDL allows any end user with a home computer to decode HFDL data traffic. While FlightAware cannot decode HFDL, PlanePlotter (www.coaa.co.uk/planeplotter.htm) employs PC-HFDL to provide a graphic display of tracked aircraft similar to that provided by FlightAware, but including those aircraft reporting their position via HFDL.

Aviation customers may have valid business reasons for preventing the general public (in particular, their competitors) from tracking the positions or flight plans of their aircraft and making inferences therefrom. Currently, only two options are available to those wishing to block public tracking of their aircraft, both of which are associated with particular drawbacks. A request may be filed with the FAA to block entirely a given aircraft tail number (thereby preventing any tracking data for that tail number from being broadcast to ASDI vendors). Similarly, a customer may request selective blocking of a given tail number from an ASDI vendor (in which case tracking data is still broadcast to the vendor, but the vendor agrees not to display it). In the first case, an FAA source block prevents a party (or, e.g., interested friendly personnel such as administrative staff or family members) from tracking its own aircraft. In the second case, a party may be required to contact multiple vendors to achieve selective blocking; in addition, charges may be associated with this service.

SUMMARY

In one aspect, embodiments of the inventive concepts disclosed herein are directed to an apparatus for encrypting High Frequency Data Link (HFDL) position reports. The apparatus may include a position receiver for receiving signals from location satellites and determining a position of an aircraft based on the received signals. The apparatus may include processors for generating position data based on the determined position and a unique identifier of the aircraft. The apparatus may include a cryptographic engine for generating an encrypted position by applying one or more cryptographic keys to the position data; the encrypted position may be decrypted by either a subscriber key or a control key. The apparatus may include an antenna and a coupler for scanning the high frequency range for uplink and downlink frequencies. The apparatus may include an HF data radio for receiving position report requests from HF ground stations (via uplink frequency) and transmitting the encrypted position to the HF ground stations (via downlink frequency).

In a further aspect, embodiments of the inventive concepts disclosed herein are directed to an HFDL communications system. The system may include processors for receiving position data from a position receiver of an aircraft, the position data corresponding to a determined position of the aircraft, and generating data packets based on the position data and a unique identifier of the aircraft. The system may include a cryptographic engine for encrypting the data packets by applying one or more encryption keys, the encrypted data packets decryptable by a subscriber decryption key and a control decryption key. The system may include an HF data radio for receiving position report requests from HF ground stations via an HF uplink frequency and transmitting the encrypted data packets to the HF ground stations via an HF downlink frequency. The system may include an HF antenna and a coupler for scanning the HF range for the uplink and downlink frequencies.

In a still further aspect, embodiments of the inventive concepts disclosed herein are directed to a method for encrypting HFDL position reports. The method may include receiving aboard an aircraft, via an HF uplink frequency, a position report request from an HF ground station. The method may include determining a position of the aircraft via a position receiver. The method may include generating data packets based on the determined position and a unique identifier of the aircraft. The method may include generating encrypted position data by applying encryption keys to the data packets. The method may include scanning the HF range for uplink and downlink frequencies, and transmitting the encrypted position data to the HF ground station at the HF downlink frequency.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 3 illustrates an exemplary embodiment of a method for encrypting HFDL position reports according to the inventive concepts disclosed herein.

DETAILED DESCRIPTION OF EXEMPLARY EMBODIMENTS

Figure 1:
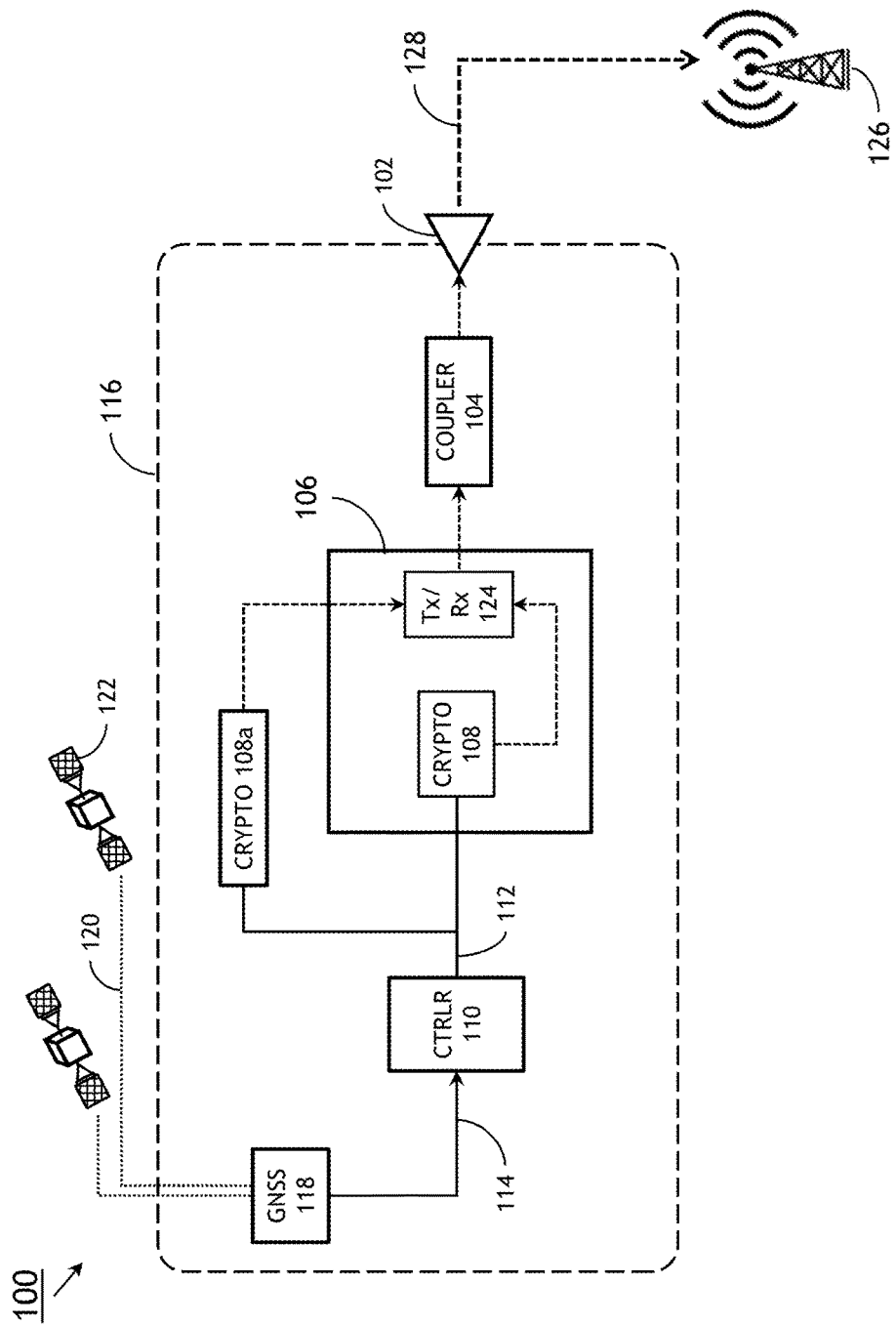
FIG. 1 illustrates an exemplary embodiment of a system for encrypting HFDL position reports according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a system and related methods for encrypting HFDL position reports. Periodic reports of an aircraft position and identifier may be encrypted so that the aircraft may not be publicly tracked. Position data may be accessed by both air traffic control services and interested parties (e.g., aviation customers) via decryption keys.

Referring to FIG. 1, an exemplary embodiment of a system 100 for encoding HFDL position reports may include an HF antenna 102, an HF coupler 104, an HF data radio 106, a cryptographic engine 108, and a controller 110 including one or more processors. The cryptographic engine 108 may be incorporated into the HF data radio 106, or housed (108a) in an appliqué or similar bump-in-the-wire device linked to the connection (112) between the controller 110 and the HF data radio 106. The controller 110 may receive position data (114) of an aircraft 116 aboard which the system 100 is embodied. The position data 114 may be generated by an onboard Global Navigation Satellite System (GNSS) receiver 118 (e.g., GPS, GLONASS, Compass, Galileo) or similar position receiver configured to determine a current position of the aircraft 116 based on navigational signals 120 received from GNSS satellites 122. The controller 110 may generate data packets based on the received position data, each data packet including a determined position of the aircraft 116 and a unique identifier (e.g., an International Civil Aviation Organization (ICAO) address) assigned to, or otherwise specific to, the aircraft 116.

The HF data radio 106 may include one or more transceivers 124 connected to the HF coupler 104 and HF antenna 102 and configured for voice or data communications. The HF data radio 106 (particularly the transceiver 124 and coupler 104) may continually scan the HF range (2.0 MHz-30 MHz) for optimal uplink and downlink frequencies by which to communicate with one or more HF ground stations (HGS) 126. In the alternative, the HGS 126 may signal the aircraft 116 with instructions, including uplink frequencies for receiving messages from the HGS 126 or downlink frequencies for transmitting messages thereto. Transmissions from the aircraft 116 to an HGS 126 may include position data. For example, when the aircraft 116 logs onto (e.g., establishes contact with) an HGS 126, the aircraft may transmit frequency diagnostic information in response to a request from the HGS 126. Furthermore, the aircraft 116 may transmit performance diagnostic information to the HGS 126 if polled by the HGS or, for example, if data space exists within an ACARS message. During periods of low activity or inactivity, e.g., transoceanic crossings, the HGS 126 may poll the aircraft 116 every 10 minutes (or more frequently, if desired) to confirm the position of the aircraft 116.

Position data of the aircraft 116 may be encrypted by the cryptographic engine 108/108a for transmission (e.g., as a frequency diagnostic packet or a performance diagnostic packet) to the HGS 126. For example, the cryptographic engine 108/108a may apply one or more encryption keys to the position data to generate encrypted position data. The encrypted position data may be incorporated into a frequency diagnostic packet or a performance data packet for transmission (128) by the transceiver 124 of the HF data radio 106, at an HF downlink frequency scanned for by the HF coupler 104.

Figure 2:
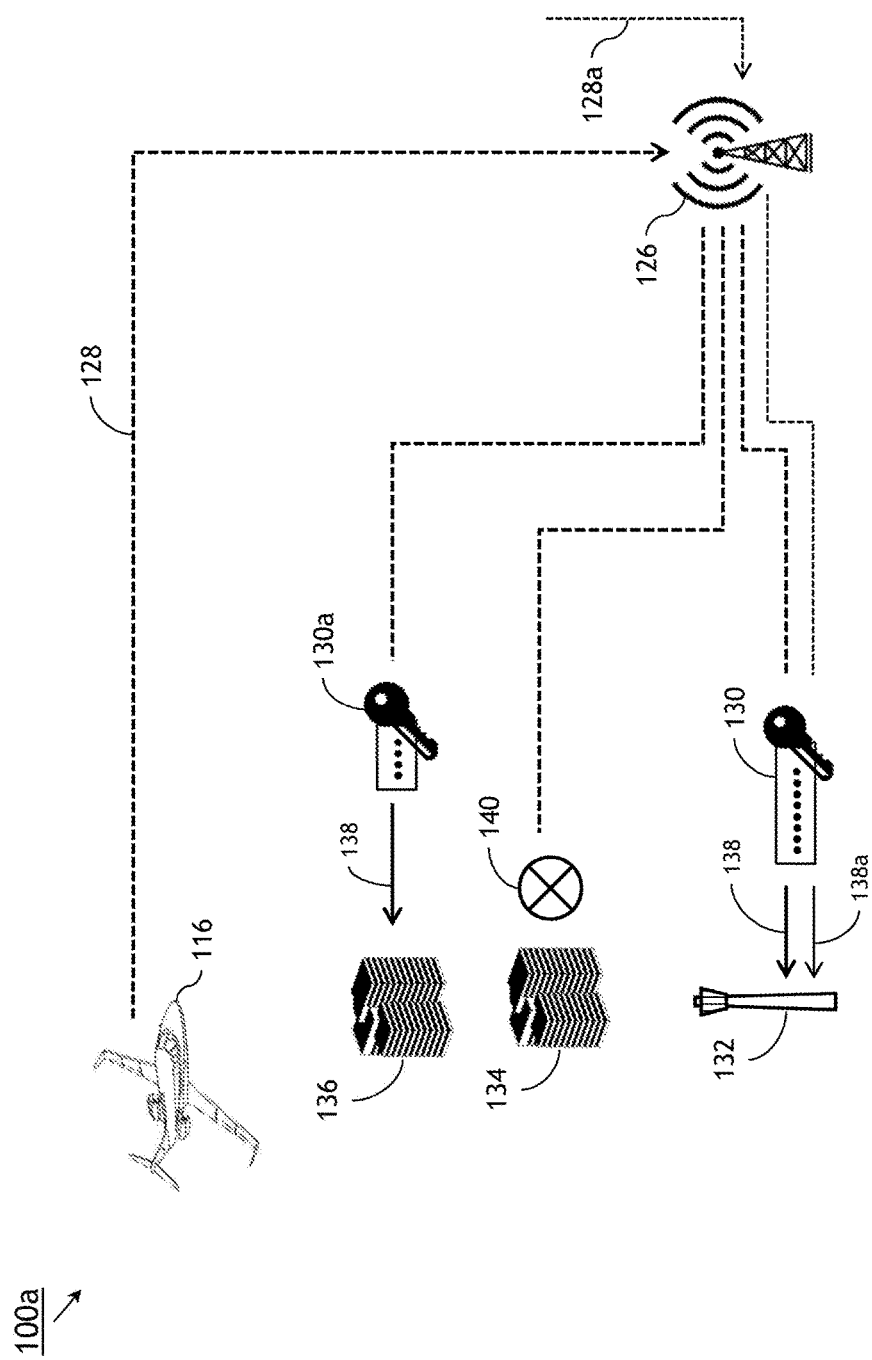
FIG. 2 illustrates transmission operations of the system of FIG. 1.

Referring now to FIG. 2, an exemplary embodiment of a system 100a for encoding HFDL position reports may be implemented and may operate similarly to the system 100 of FIG. 1, except that the system 100a may include two decryption keys, a control key 130 and a subscriber key 130a, for decrypting the encrypted position data transmitted (128) by the aircraft 116 to the HGS 126. The HGS 126 may receive transmissions (128) from the aircraft 116 as well as other HFDL transmissions (128a) from other aircraft within its operating area. The HGS may forward received transmissions to the appropriate air traffic control (ATC) facilities 132, which may in turn forward the received information to ASDI vendors 134 or other end users 136. In addition, ASDI vendors 134 and end users 136 may independently receive transmitted HFDL messages.

Encrypted position data transmitted by the aircraft 116 may be encrypted such that one of two types of decryption keys may decode the encrypted position data and locate the aircraft 116. ATC facilities 132 may be in possession of a control key 130, allowing the ATC facilities to accurately track the aircraft 116 for traffic control and separation purposes. A control key 130 may enable the ATC facility 132 to decode encrypted position information from multiple aircraft (transmissions 128, 128a); deriving therefrom the positions and identifiers (138, 138a) of the aircraft 116 as well as other aircraft transmitting to a given HGS 126. The control key 130 may be a universal or master key capable of decrypting transmissions from all aircraft, or include several sets of group or class keys, each group key corresponding to a specific subset of aircraft. End users 136 may purchase a subscriber key 130a that allows the end users (administrative staff, family members, co-workers) to decode encrypted position data transmitted (128) to the HGS 126 by the aircraft 116 and only that aircraft, providing the end users 136 with accurate positions and identifiers (138) of the aircraft 116. For example, the owner of each aircraft 116 may be issued, or may generate, a unique subscriber key 130a corresponding to that aircraft alone. A subscriber key 130a may be derived from, or mathematically tied in some way to, the 24-bit ICAO address issued to the aircraft 116 (and specific to its transponder equipment). ASDI vendors 134 and other parties without a subscriber key 130a may have access to encrypted transmissions (128) from the aircraft 116 to the HGS 126, but are blocked (140) from receiving position or identification information.

Referring now to FIG. 3, an exemplary embodiment of a method 200 for encrypting HFDL position reports according to the inventive concepts disclosed herein may be implemented by the system 100 in some embodiments, and may include one or more of the following steps. At a step 202, an HFDL data radio of an aircraft receives (via its HF transceiver), at an uplink frequency in the HF range (2.0 MHz-30 MHz), a request for a position report from an HGS. For example, the HGS may request a frequency diagnostic packet or a performance diagnostic packet from the aircraft.

At a step 204, a position receiver aboard the aircraft determines a position of the aircraft.

At a step 206, the controller generates position data of the aircraft, based on the determined position and a unique identifier of the aircraft. For example, the unique identifier may include, or may be based on, the ICAO address of the aircraft.

At a step 208, the cryptographic engine encrypts the generated position data by applying one or more encryption keys to the position data. The encrypted position data may be decryptable by either a control key (provided to the HGS or to an ATC facility connected thereto) or a subscriber key (which may be specific to the aircraft (and associated with its unique identifier (e.g., ICAO address)) and provided to an owner of the aircraft).

At a step 210, the HF transceiver/coupler of the aircraft scans the HF range for an HF downlink frequency.

At a step 212, the HF data radio (via the HF coupler and antenna) transmits the encrypted position data to the HGS at the determined HF downlink frequency. For example, the encrypted position data may be transmitted to the HGS as a frequency diagnostic packet or as a performance diagnostic packet.

As will be appreciated from the above, systems and methods according to embodiments of the inventive concepts disclosed herein may provide a low-SWaP-C and efficient means for business aviation customers to efficiently control access to the real-time tracking of their aircraft, preventing tracking information from reaching competitors while retaining the ability to track their own aircraft.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. An apparatus for encrypting High Frequency Data Link (HFDL) position reports, comprising:
   at least one position receiver of an aircraft, the position receiver configured to:
   receive a position signal from one or more positioning satellites; and
   determine a position of the aircraft based on the one or more received position signals;
   at least one processor coupled to the position receiver, the processor configured to generate at least one data packet based on at least the determined position and a unique identifier of the aircraft;
   at least one cryptographic engine coupled to the processor and configured to generate encrypted position data by applying one or more encryption keys to the data packet, the encrypted position data including the determined position of the aircraft and associated with at least a first decryption key and a second decryption key, the first decryption key corresponding to the unique identifier and the second decryption key is associated with at least one HFDL ground station;
   at least one high frequency (HF) antenna configured for transmission and reception within a spectral band between 2.0 MHz and 30 MHz;
   at least one HF coupler operatively coupled to the HF antenna;

at least one HF data radio coupled to the processor and to the coupler by a physical link, the at least one cryptographic engine is embodied in a bump-in-the-wire device removably attached to the physical link, the HF data radio configured to:
scan the spectral band between 2.0 MHz and 30 MHz for at least one of an HFDL uplink frequency and an HFDL downlink frequency, the HFDL uplink frequency and the HFDL downlink frequency associated with the at least one HFDL ground station, the HFDL downlink frequency independent from a position of the HFDL ground station;
receive at least one request for a position report from the HFDL ground station via the HFDL uplink frequency; and
in response to the request, transmit the encrypted position data to the HFDL ground station via the HFDL downlink frequency.

2. The apparatus of claim 1, wherein the cryptographic engine is embodied in the HF data radio.

3. The apparatus of claim 1, wherein the encrypted position data is incorporated into at least one of an HFDL frequency packet and an HFDL performance packet.

4. The apparatus of claim 1, wherein the unique identifier includes an ICAO address.

5. A High Frequency Data Link (HFDL) communications system, comprising:
at least one processor configured to:
receive position data from a position receiver of an aircraft, the position data corresponding to a position of the aircraft; and
generate at least one data packet based on the position data and a unique identifier of the aircraft;
at least one cryptographic engine coupled to the processor and configured to generate encrypted position data by applying one or more encryption keys to the data packet, the encrypted position data including the received position data and associated with at least a first decryption key and a second decryption key, the first decryption key corresponding to the unique identifier and the second decryption key is associated with at least one HFDL ground station;
at least one HF data radio coupled to the processor and to the cryptographic engine by a physical link, the at least one cryptographic engine is embodied in a bump-in-the-wire device removably attached to the physical link, the HF data radio including at least one transceiver configured to:
scan a spectral band between 2.0 MHz and 30 MHz for at least one of an HFDL uplink frequency and an HFDL downlink frequency, the HFDL uplink frequency and the HFDL downlink frequency associated with at least one HFDL ground station;
receive at least one request for a position report from an HFDL ground station via the HFDL uplink frequency; and
in response to the request, transmit the encrypted position data to the HFDL ground station via the HFDL downlink frequency, the HFDL downlink frequency independent from a position of the HFDL ground station;
at least one HF coupler coupled to the HF data radio; and
at least one HF antenna configured for transmission and reception within a spectral band between 2.0 MHz and 30 MHz coupled to the HF coupler.

6. The HFDL communications system of claim 5, wherein the cryptographic engine is embodied in the HF data radio.

7. The HFDL communications system of claim 5, wherein the encrypted position data is incorporated into at least one of an HFDL frequency packet and an HFDL performance packet.

8. The HFDL communications system of claim 5, wherein the unique identifier includes an ICAO address.

9. A method for encrypting High Frequency Data Link (HFDL) position reports, the method comprising:
receiving, via an HF data radio, at least one request for a position report from an HFDL ground station at an HFDL uplink frequency, the position report associated with an aircraft;
receiving position data from at least one position receiver of the aircraft;
generating at least one data packet based on at least the position data and a unique identifier of the aircraft;
generating encrypted position data by applying at least one encryption key, a first decryption key and a second decryption key to the generated data packet, the first decryption key corresponding to the unique identifier and the second decryption key associated with at least one HFDL ground station, the encrypted position data including the received position data;
scanning within a spectral band between 2.0 MHz and 30 MHz for an HFDL downlink frequency via the HF data radio; and
transmitting, via the HF data radio, the encrypted position data to the HFDL ground station at the HFDL downlink frequency, the HFDL downlink frequency independent from a position of the HFDL ground station.

10. The method of claim 9, wherein receiving, via an HF data radio, at least one request for a position report from an HFDL ground station at an HFDL uplink frequency, the position report associated with an aircraft includes:
receiving, via the HF data radio, a request for at least one of an HFDL frequency packet and an HFDL performance packet from the HFDL ground station at the HFDL uplink frequency.

11. The method of claim 10, wherein transmitting, via the HF data radio, the encrypted position data to the HFDL ground station at the HFDL downlink frequency includes:
transmitting, via the HF data radio, at least one of the HFDL frequency packet including the encrypted position data and the HFDL performance packet including the encrypted position data to the HFDL ground station at the HFDL downlink frequency.

12. The method of claim 9, wherein generating at least one data packet based on at least the determined position and a unique identifier of the aircraft includes:
generating at least one data packet based on at least the determined position and an ICAO address of the aircraft.

* * * * *